United States Patent
Masuda

(10) Patent No.: US 9,601,725 B2
(45) Date of Patent: *Mar. 21, 2017

(54) ENERGY STORAGE ELEMENT

(71) Applicant: GS Yuasa International Ltd., Kyoto (JP)

(72) Inventor: Hideki Masuda, Kyoto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/056,686

(22) Filed: Feb. 29, 2016

(65) Prior Publication Data
US 2016/0181578 A1 Jun. 23, 2016

Related U.S. Application Data

(63) Continuation of application No. 13/688,079, filed on Nov. 28, 2012, now Pat. No. 9,299,964.

(30) Foreign Application Priority Data

Nov. 29, 2011 (JP) .................. 2011-261069
Nov. 9, 2012 (JP) .................. 2012-247745

(51) Int. Cl.
H01M 2/04 (2006.01)
H01M 2/06 (2006.01)
H01M 2/30 (2006.01)
H01M 2/02 (2006.01)
H01M 2/26 (2006.01)

(52) U.S. Cl.
CPC ........... *H01M 2/06* (2013.01); *H01M 2/0217* (2013.01); *H01M 2/0473* (2013.01); *H01M 2/26* (2013.01); *H01M 2/263* (2013.01); *H01M 2/30* (2013.01)

(58) Field of Classification Search
CPC ........ H01M 2/06; H01M 2/26; H01M 2/0217; H01M 2/0473; H01M 2/263; H01M 2/30
See application file for complete search history.

(56) References Cited

U.S. PATENT DOCUMENTS

| | | | | |
|---|---|---|---|---|
| 9,105,881 | B2 * | 8/2015 | Masuda | H01M 2/0202 |
| 9,118,070 | B2 * | 8/2015 | Masuda | H01M 2/22 |
| 9,172,078 | B2 * | 10/2015 | Masuda | H01M 2/24 |
| 9,299,964 | B2 * | 3/2016 | Masuda | H01M 2/0217 |
| 2010/0233528 | A1 | 9/2010 | Kim et al. | |

(Continued)

FOREIGN PATENT DOCUMENTS

| | | |
|---|---|---|
| JP | 2010-97822 A | 4/2010 |
| JP | 2011-81950 A | 4/2011 |
| WO | WO 2010/147136 A1 | 12/2010 |

*Primary Examiner* — Stewart Fraser

(74) *Attorney, Agent, or Firm* — McGinn IP Law Group, PLLC

(57) ABSTRACT

An energy storage element includes a container that includes a container body including an opening and a cap part formed on the opening, an electrode assembly housed in the container, an electrode terminal, and a current collector which electrically connects the electrode terminal and the electrode assembly. The cap part of the container includes an outer surface including a protrusion part formed to protrude outward from the outer surface, and an inner surface including a recess part formed at a position corresponding to a position of the protrusion part.

6 Claims, 10 Drawing Sheets

(56) References Cited

U.S. PATENT DOCUMENTS

| | | |
|---|---|---|
| 2012/0021277 A1 | 1/2012 | Byun et al. |
| 2012/0088138 A1 | 4/2012 | Munenaga et al. |
| 2012/0148909 A1 | 6/2012 | Ito et al. |
| 2012/0148911 A1 | 6/2012 | Suzuki et al. |
| 2012/0196178 A1 | 8/2012 | Kambayashi et al. |
| 2012/0196179 A1 | 8/2012 | Suzuki et al. |
| 2013/0136977 A1 | 5/2013 | Masuda |

* cited by examiner

FIG. 5A
FIG. 5B
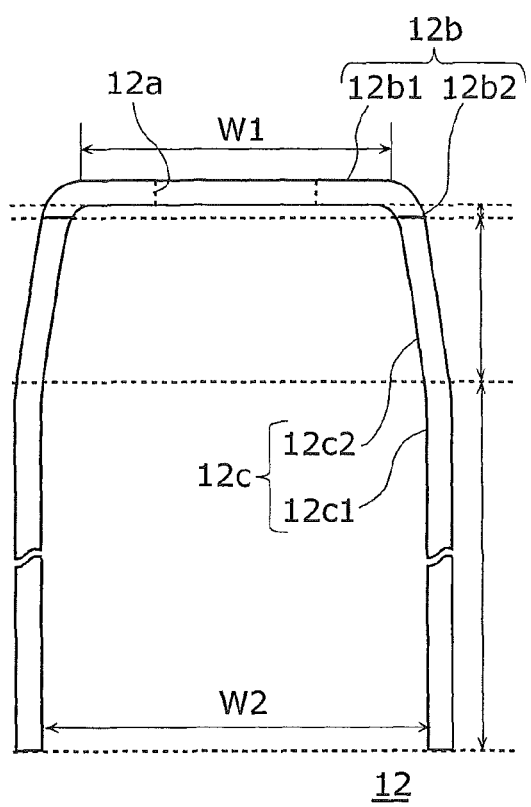
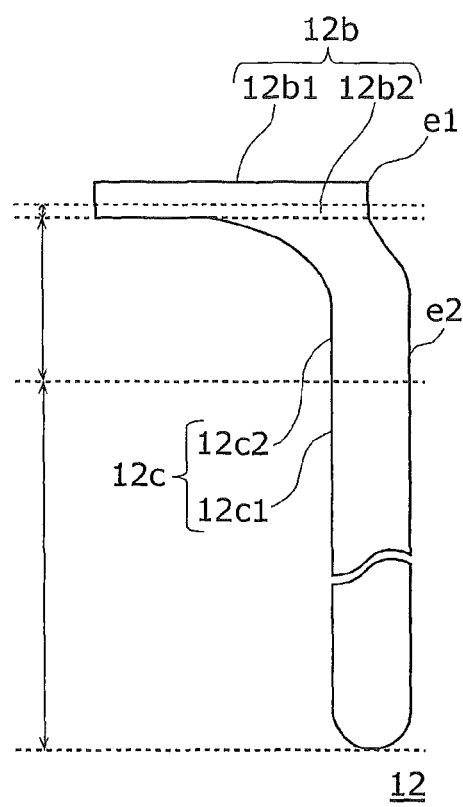
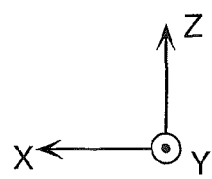
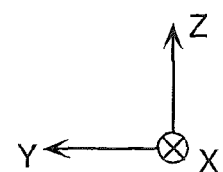

ENERGY STORAGE ELEMENT

This application as a Continuation application of U.S. patent application Ser. No. 13/688,079, filed on Nov. 28, 2012, the disclosure of which is incorporated herein in its entirety by reference.

CROSS REFERENCE TO RELATED APPLICATIONS

The present application is based on and claims priority of Japanese Patent Application No. 2011-261069 filed on Nov. 29, 2011 and Japanese Patent Application No, 2012-247745 filed on Nov. 9, 2012. The entire disclosures of the above-Identified applications, including the specifications, drawings and claims are incorporated herein by reference in their entirety.

FIELD

The present invention relates to an energy 'storage element such as a secondary battery and another battery.

BACKGROUND

Secondary batteries are used as replacements for primary batteries, and have been wide spread as power sources for electric appliances such as mobile phones and information technology (IT) devices. In particular, non-aqueous electrolyte secondary batteries represented by lithium ion batteries have high energy density and are increasingly applied to large industrial electric apparatuses such as electric vehicles.

A conventional non-aqueous electrolyte secondary battery has connection parts each of which is for connecting (i) a corresponding one of current collectors disposed inside the container of the battery and is electrically connected to a corresponding one of a positive electrode and a negative electrode in the electrode assembly disposed inside the container and (ii) a corresponding one of the electrode terminals outside the container, so that electric energy generated by the electrode assembly can be extracted. Each of the connection parts is formed integrally with the corresponding electrode terminal to penetrate through the cap part of the container, so as to connect the corresponding current collector inside the container and the electrode terminal outside the container. For this reason, the cap part has through-holes for allowing penetration of the respectively corresponding connection parts.

The container is generally made of metal, and thus there is a need to insulate the container areas in which through-holes are formed and the electrode terminals, the connection parts, and the current collectors. This is because a short circuit is caused in the container if the connection parts penetrate through the cap part of the container via the through-holes without any insulation. In addition, the container contains electrolyte together with the electrode assembly, and there is a need to prevent the electrolyte from leaking to the outside of the container through the through-holes.

In order to insulate the container and the electrode terminals, the connection parts, and the current collectors, and prevent the electrolyte from leaking to the outside of the container through the through-holes, a conventional energy storage element includes insulation sealing members provided to cover the cap part areas in which the through-holes of the container are formed at the outside and inside of the cap part of the container. For example, both the insulation and sealing between the container and the electrode terminals, the connection parts, and the current collectors are achieved by means of the connection parts pressure-bonding the electrode terminals outside the container and the current collectors inside the container in a state where the container areas having the through-holes are covered at both the inside and outside of the cap part of the container by the insulation sealing members (see Patent Literature below).

CITATION LIST

Patent Literature

[PTL 1]
Japanese Unexamined Patent Application Publication No. 2010-097822

SUMMARY

The present invention has been made in view of the aforementioned problems, with an aim to provide an energy storage element which can be easily made with a large tolerance and at a low cost.

In order to achieve the aforementioned aim, an energy storage element according to an aspect of the present invention is an energy storage element which includes: a container; an electrode assembly housed in the container; an electrode terminal; a current collector which electrically connects the electrode terminal and the electrode assembly; and an internal insulation sealing member which insulates the container and the current collector, wherein the container includes a wall having an outer surface and an inner surface, the outer surface has a protrusion part formed to protrude outward from the outer surface, the inner surface has a recess part formed at a position corresponding to a position of the protrusion part, the recess part has a bottom surface which is outermost and an inner side surface formed continuously between the bottom surface and the inner surface of the wall of the container, at least part of the inner side surface of the recess part is formed to be tilted with respect to a direction in which the protrusion part protrudes, and the internal insulation member is positioned between the current collector and the recess part of the container, and has a first wall part which is parallel to the at least part of the inner side surface of the recess part.

As described above, the at least part of the inner side surface of the recess part formed on the inner surface of the wall part of the container and the first side wall part facing the at least part of the inner side surface of the recess part of the internal insulation member are formed to be parallel to each other and be tilted with respect to the protrusion direction of the protrusion part. In this way, for example, when the portions of the inner side surface of the recess part are tilted so as to be farther apart from each other at positions more distant from the bottom surface, it is possible to easily bring the at least portions of the inner side surface of the recess part and the first side wall part of the internal insulation member into close contact with each other even if the recess part or the internal insulation member are formed with some tolerance, and to thus increase the air-tightness around the electrode terminal.

In addition, the at least part of the inner side surface of the recess part may be in surface contact with the first wall part of the internal insulation member, the first wall part being parallel to the at least part of the inner side surface.

In addition, the at least part of the inner side surface of the recess part may be paired portions facing each other in the inner side surface, and the paired portions may be tilted so as to be farther apart from each other at positions more distant from the bottom surface.

For this reason, it is possible to bring the recess part which is formed on the inner surface of the wall of the container and the internal insulation member into close contact with each other, and to thereby increase the air-tightness around the electrode terminal.

In addition, the paired portions facing each other in the inner side surface of the recess part may be tilted symmetrically with respect to a direction in which the protrusion part protrudes.

With the symmetrical configuration, it is possible to easily match the recess part and the internal insulation member even if one of the orientation of the recess part and the orientation of the Internal insulation member changes by 180 degrees with respect to the other. In other words, it is possible to easily align the recess part and the internal insulation member.

In addition, the internal insulation member may further include a plate part provided along a bottom surface of the recess part, the first wall part may be paired first wall parts formed continuously from the plate part, and may be parallel to the paired portions facing each other in the inner side surface of the recess part, and the paired first wall parts may be tilted so as to be farther apart from each other at positions more distant from the plate part.

In addition, the inner surface of the wall of the container may be rectangular, and the paired portions facing each other in the inner side surface of the recess part may be formed along a longitudinal direction of the inner surface of the wall of the container.

In addition, the current collector may be connected to the electrode terminal, in the recess part.

In this way, the current collector is electrically connected to the electrode terminal in the recess part of the container. In addition, the container includes a protrusion part, and the recess part is formed at the position corresponding to the position of the protrusion part.

In this way, the part of the current collector connected to the electrode terminal is housed in the recess part formed on the inner surface of the cap part of the container. Thus, it is possible to match the space for parts other than the recess part in the inner space of the container to the shape of the electrode assembly. In this way, it is possible to reduce wasteful space produced when the electrode assembly is housed inside the container only by adjusting the outer size of the electrode assembly to the size of the inner space. In this way, the shape of the container is adjusted to the shape of the electrode assembly without changing the structure of the electrode assembly. Therefore, it is possible to easily increase the housing efficiency of the electrode assembly with respect to the inner space of the container. In this way, it is possible to increase the energy storage capacity per unit volume of the energy storage element.

In addition, the current collector may include a base part which is connected to the electrode terminal, in the recess part, and the internal insulation member may insulate the container and the current collector by being sandwiched by the recess part of the container and the base part.

In this way, the current collector is connected to the electrode terminal at a position inside the recess part of the container, and the internal insulation member is housed at the position at which the current collector is in contact with the recess part. In addition, for example, when the first side wall part of the internal insulation member to be in contact with the current collector is formed to have parts tilted so as to be farther apart from each other at positions more distant from the plate part, it is possible to form the base part of the current collector to have a shape matching the shape of the first side wall part of the internal insulation member. In addition, in this case, and when the current collector includes paired arm parts for sandwitching the electrode assembly, it is possible to easily secure a wide spacing between the paired arm parts for sandwitching the electrode assembly. In this way, it is possible to increase the size of the electrode assembly to be sandwitched by the paired arm parts. In other words, it is possible to increase the volume of the electrode assembly to be housed inside the container, and thereby further increase the housing efficiency of the electrode assembly with respect to the capacity of the container. In this way, it is possible to increase the energy storage capacity per unit volume of the energy storage element.

In addition, the current collector may further include an arm part which extends from the base part toward a side opposite to the direction in which the protrusion part protrudes, and which is connected to the electrode assembly, and the arm part may include an arm body which is connected to the electrode assembly and a bridge part which connects the arm body and the base part.

In addition, the base part may include: a plate part which is directly connected to the electrode terminal; and a wall part which is formed continuously from the bridge part and is bent or curved with respect to the plate part, and the wall part of the base part may face the inner side surface of the recess part through the first wall part of the inner insulation member.

In addition, the wall part of the base part may be in surface contact with the first wall part of the internal insulation member.

Furthermore, the energy storage element according to an aspect of the present invention may be an energy storage element which includes: a container; an electrode assembly housed in the container; an electrode terminal; a current collector which electrically connects the electrode terminal and the electrode assembly; and an external insulation sealing member which insulates the container and the electrode terminal, wherein the container includes a wall having an outer surface and an inner surface, the outer surface has a protrusion part formed to protrude outward from the outer surface, the protrusion part has a top part which is outermost and an outer side surface formed continuously between the top part and the outer side surface of the wall of the container, at least part of the outer side surface is provided to be tilted with respect to a direction in which the protrusion part protrudes, and the external insulation member is disposed between the electrode terminal and the protrusion part of the container, and includes a second wall part parallel to the at least part of the outer surface of the protrusion part.

In addition, the container may further include a recess part formed at a position corresponding to a position of the protrusion part, and the current collector is connected to the electrode terminal, in the recess part.

As described above, the at least part of the outer side surface of the protrusion part on the outer surface of the container and the second side wall part facing the at least part of the outer side surface of the protrusion part of the external insulation member are formed to be parallel to each other and be tilted with respect to the protrusion direction of the protrusion part. In this way, for example, when the portions of the outer side surface of the protrusion part are tilted so as to be farther apart from each other at positions more distant from the top part of the protrusion part, it is possible to bring the at least portions of the outer side surface of the protrusion part and the second side wall part of the external insulation member into close contact with each other even if the protrusion part and the external insulation member are formed with some tolerance, and to thus increase the air-tightness around the electrode terminal.

BRIEF DESCRIPTION OF DRAWINGS

These and other objects, advantages and features of the invention will become apparent from the following description thereof taken in conjunction with the accompanying drawings that illustrate a specific embodiment of the present invention.

FIG. 5A is a view of a current collector when viewed in the Y-axis direction in a non-aqueous electrolyte secondary battery according to the present invention.

FIG. 5B is a view of the collector when viewed in the X-axis direction in the non-aqueous electrolyte secondary battery.

DESCRIPTION OF EMBODIMENTS

When manufacturing a conventional energy storage element, the following problem arises that it is difficult to provide components such as electrode terminals while maintaining designed postures thereof especially when the electrode terminals do not have the shape of a circle having a center axis that matches the center axis of the through-holes because insulation sealing members rotate about the center axis of the through-holes when the electrode terminals and current collectors are pressure-bonded by connection parts.

Figure 9:
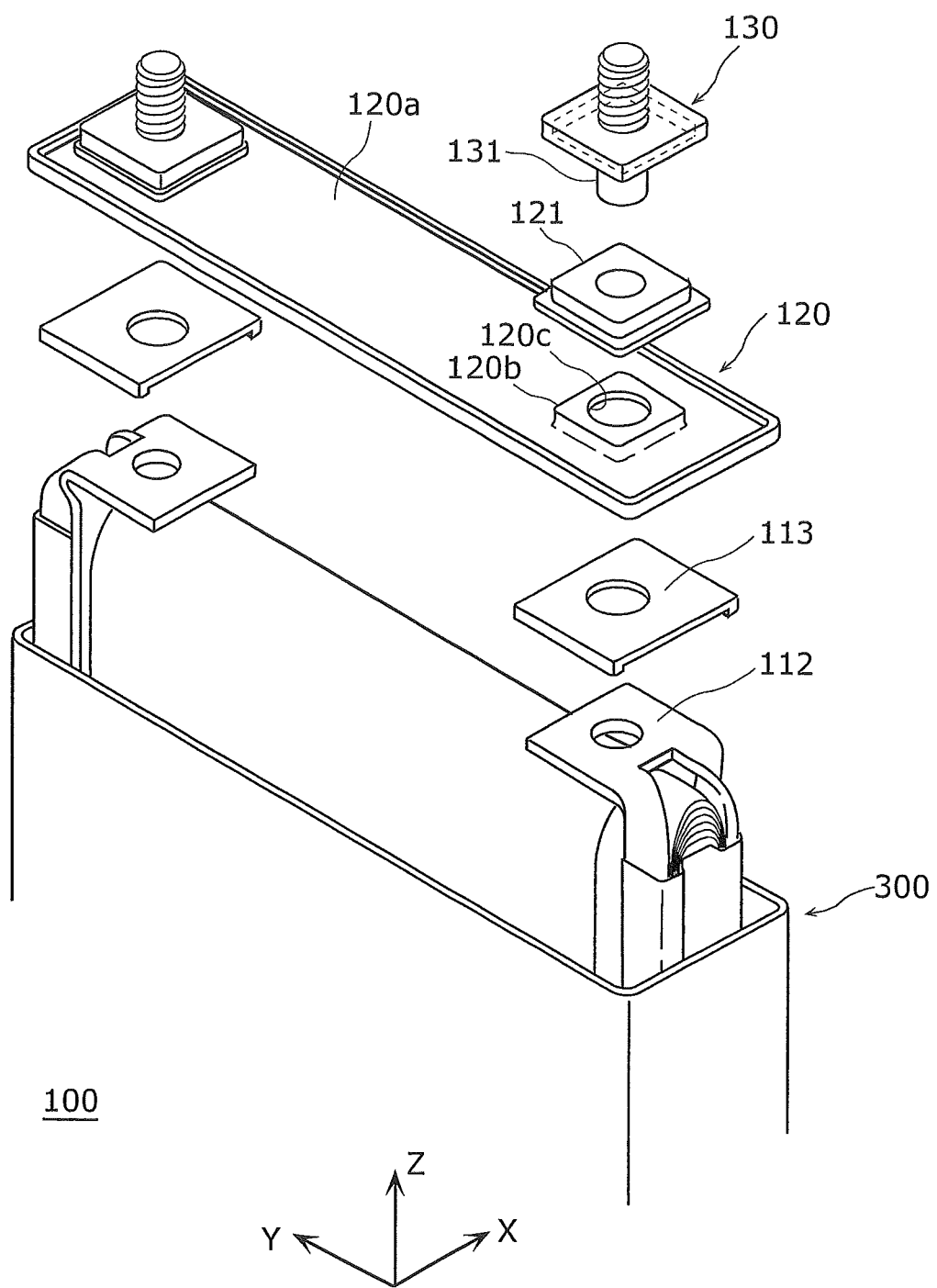
FIG. 9 is a schematic exploded perspective view of a non-aqueous electrolyte secondary battery according to a conventional technique.
Figure 10:
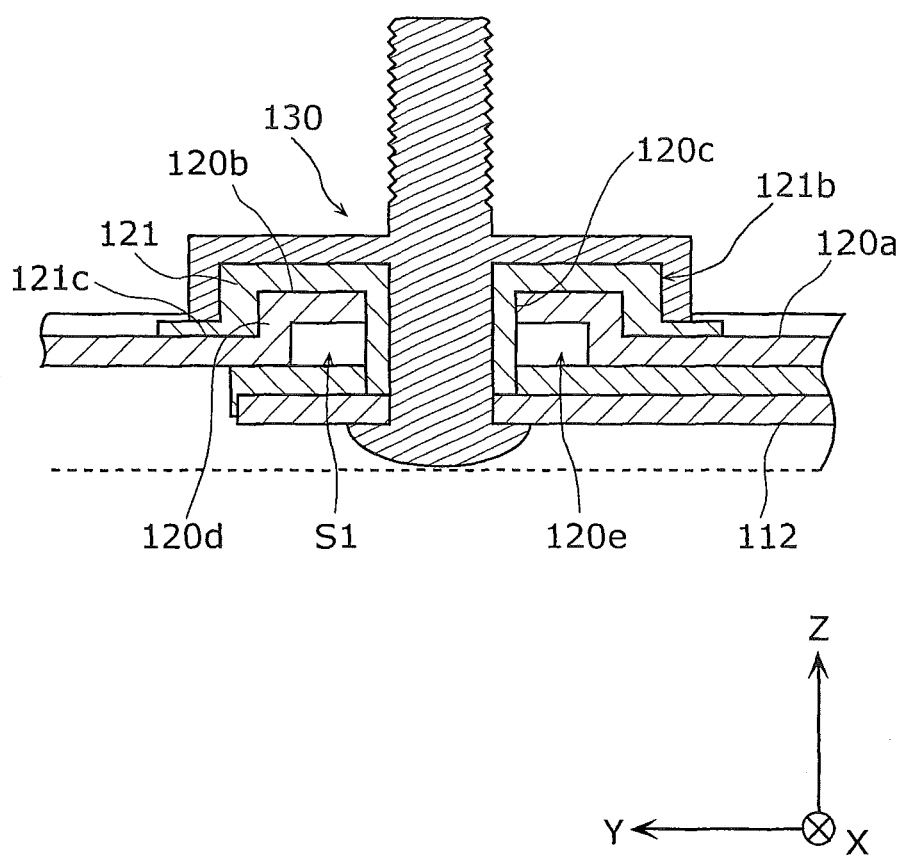
FIG. 10 is a cross-sectional view of the non-aqueous electrolyte secondary battery according to the conventional technique.

In order to solve this problem, as shown in FIG. 9 and FIG. 10, the above-identified Patent Literature 1 further provides: (i) around a through-hole 120c, a protrusion part 120b which protrudes outward from a container 300 and has a non-circular shape in a top view; and (ii) an insulation sealing member 121 with a rotation preventing part 121b which is a side surface of the protrusion part 120b. In other words, the rotation preventing part 121b provided to the insulation sealing member 121 is engaged with the side surface of the protrusion part 120b formed in the container 300, which prevents the Insulation sealing member 121 from rotating about the through-hole 120c. FIG. 9 is a schematic exploded perspective view of a conventional non-aqueous electrolyte secondary battery. FIG. 10 is a cross-sectional view of main parts around the electrode terminals of the conventional non-aqueous electrolyte secondary battery.

However, as shown in FIG. 10, the non-aqueous electrolyte secondary battery 100 includes a cap part 120 having an upper surface 120a, a wall surface 120d formed to stand on the upper surface 120a, and a protrusion part 120b formed partly integrally with the wall surface 120d. In this way, the electrode terminal 130 and the current collector 112 are connected to each other in the non-aqueous electrolyte secondary battery 100 having the protrusion part 120b, and thus, a space S1 is inevitably produced between the recess part 120e and the internal insulation sealing member 113. For this reason, when the container 300, the external insulation sealing member 121, the internal insulation sealing member 113, and the current collector 112 are pressure-bonded by a riveted end of the electrode terminal 130, the container 300, the external insulation sealing member 121, the internal insulation sealing member 113, and the current collector 112 are inevitably deformed toward the inside of the space S1. For this reason, it is difficult to secure air-tightness of the container 300.

In view of this, examples of conceivable solutions to such problems include to form an internal insulation sealing member and a current collector each having a shape matching the shape of the space S1 inside the recess part 120e. In other words, it is conceivable to employ a configuration for securing air-tightness in which a wall part parallel to the wall surface 120d of the protrusion part 120b is formed as the internal insulation sealing member (not shown), and the internal insulation sealing member is interfit with the inside of the recess part 120e such that the wall part of the internal insulation sealing member and the wall surface 120d of the recess part 120e abut each other. With this, it is possible to secure air-tightness of the container 300 because there is no such space S1 in the recess part 120e.

However, when such a configuration is realized, both the recess part and the internal insulation sealing member 113 need to be precisely formed. In other words, when the internal insulation sealing member 113 is larger than the recess part, the internal insulation sealing member 113 cannot naturally be interfit with the recess part. On the other hand, when the recess part is larger than the internal insulation sealing member 113, the internal insulation sealing member 113 turns or rotates about an axis that is the connection part 131 at a small angle in the recess part (in other words, the internal insulation sealing member 113 displaces). This is a factor that affects the air-tightness around the electrode terminal 130.

In this way, in order to secure air-tightness around the electrode terminal 130, each of the recess part of the cap part 120 and the internal insulation sealing member 113 needs to be formed to have a highly precise size. However, this lengthens the manufacturing processes and increases the manufacturing cost.

Hereinafter, an embodiment of the present invention is described with reference to the drawings. The exemplary embodiment described below shows a specific preferable example. The numerical values, shapes, materials, structural elements, the arrangement and connection of the structural elements etc. shown in the following exemplary embodiment are mere examples, and therefore do not limit the scope of the present invention. Therefore, among the structural elements in the following exemplary embodiment, structural elements not recited in any one of the independent claims defining the most generic concept of the present invention are described as arbitrary structural elements in preferable implementations.

EMBODIMENT

Figure 1:
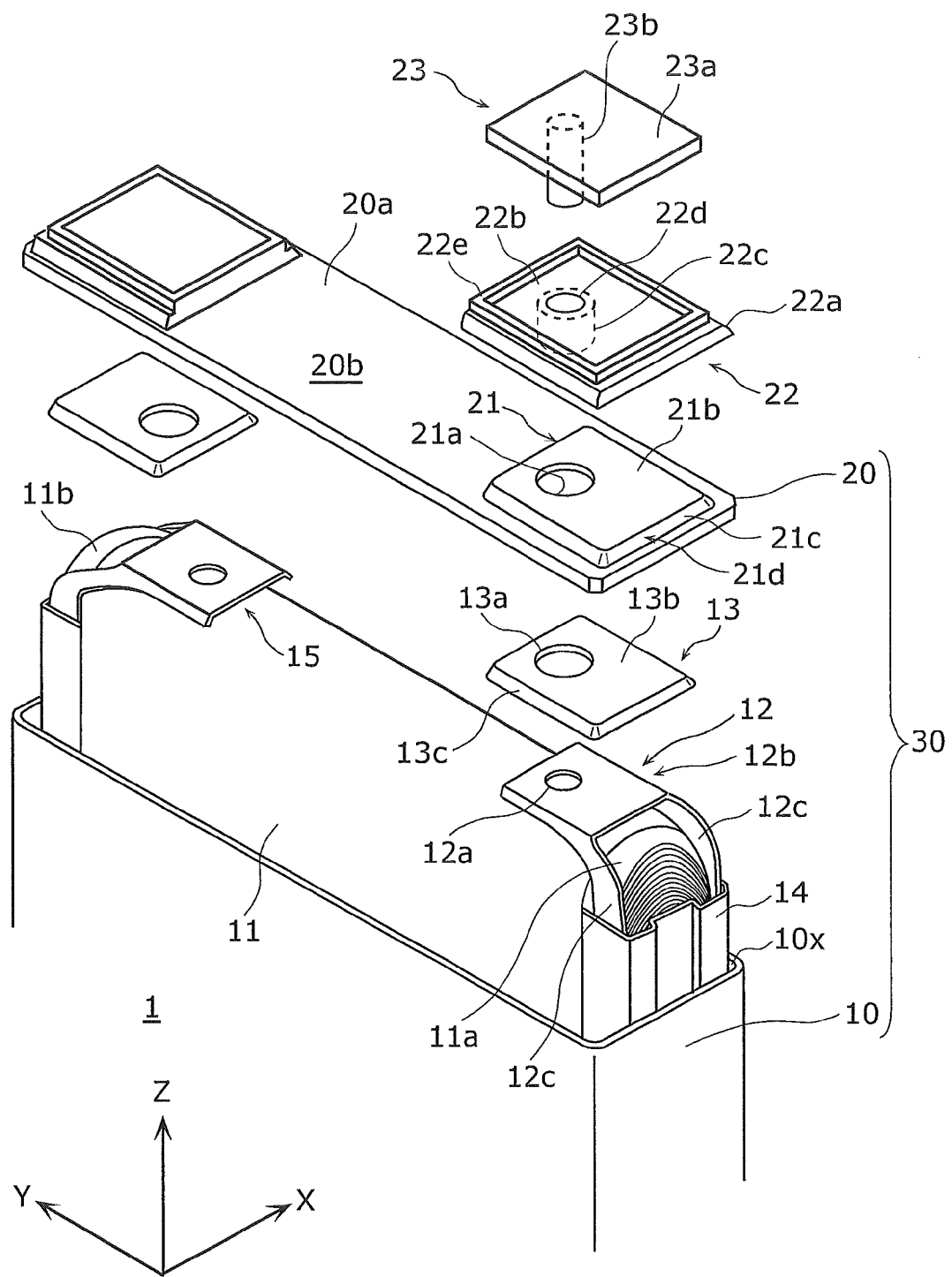
FIG. 1 is a schematic exploded perspective view of a non-aqueous electrolyte secondary battery according to an embodiment of the present invention.

FIG. 1 is a schematic exploded perspective view of a non-aqueous electrolyte secondary battery 1 having an exemplary structure according to an embodiment of the present invention.

As shown in FIG. 1, the non-aqueous electrolyte secondary battery 1 according to this embodiment includes: a container 30; an electrode assembly 11 housed inside the container 30; an electrode terminal 23; current collectors 12 and 15 for electrically connecting the electrode terminal 23 and the electrode assembly 11; an external insulation sealing member 22 which insulates the container 30 and the electrode terminal 23; and an internal Insulation sealing member 13 for insulating the container 30 and the current collectors 12 and 15.

The container 30 includes a container body 10 and a cap part 20. The cap part 20 is a member having a long plate shape extending in the X-axis direction (described later), and forms a part of the inner wall of the container 30. The container body 10 is a rectangular cylindrical member having an opening 10x at a first end and a bottom at a second end. In this embodiment, the direction in which the container body 10 and the cap part 20 are arranged is referred to as an upper-lower direction (the Z-axis direction in FIG. 1), the direction in which a positive terminal and a negative terminal are arranged is referred to as a left-right direction (the Y-axis direction in FIG. 1), and the direction perpendicular to the upper-lower direction and the left-right direction is referred to as a front-back direction (the X-axis direction in FIG. 1).

The cap part 20 includes, at each of the end parts in the lengthwise direction, a protrusion part 21 which protrudes outward from an upper surface 20b of the cap part 20 of the container 30 and a plate-shaped cap body 20a which is the part other than the protrusion part 21. Here, the upper surface 20b of the cap part 20 is an outer surface of the cap body 20a of the container 30. In other words, the cap part 20 of the container 30 includes a wall having an outer surface partly protrudes outward to be the protrusion part 21.

The protrusion part 21 includes a plate part 21b which is a top part and a side wall part 21d. The plate part 21b is a flat-plate shaped member which makes up the upper part of the protrusion part 21, has a shape of a rectangle having parallel sides in the X-axis direction and the Y-axis direction in a plan view, and is parallel to the cap body 20a. In addition, the protrusion part 21 includes the plate part 21b with a through-hole 21a for allowing penetration of the electrode terminal 23. Here, FIG. 1 shows only a through-hole 21a at the positive electrode side, and does not show a-through-hole at the negative electrode side because the latter through-hole is hidden behind an insulation sealing member later described.

An electrode assembly 11 is formed by stacking band-shaped positive and negative electrodes with a separator inbetween and winding the whole stack in the shape of a long cylinder. The electrode assembly 11 is housed in the container 30 in the direction in which the winding axis direction matches the Y-axis direction and the long axis of the cross section which is a long circle in shape matches the Z-axis direction. The positive electrode and the negative electrode are shifted from each other in the winding axis direction and are wound about the winding axis direction in the shape of the long circle. The electrode assembly 11 includes projection parts 11a and 11b corresponding to the positive electrode and the negative electrode and each of which projects outward from a corresponding separator in the winding axis direction (the Y-axis direction) of the electrode assembly 11. In other words, the electrode assembly 11 includes the projection part 11a disposed at the positive electrode side and projecting from the separator at a first end in the winding axis direction, and the projection part 11b disposed at the negative electrode side and projecting from the separator at a second end in the winding axis direction. Furthermore, the projection part 11a at the positive electrode side and the projection part 11b at the negative electrode side do not include any active material, and thus metal foil which is a base material thereof is exposed. More specifically, the projection part 11a at the positive electrode side includes exposed aluminum foil which is the base material of the positive electrode without any positive electrode active layer, and the projection part 11b at the negative electrode side includes exposed cupper foil which is the base material of the negative electrode without any negative electrode active layer. To the projection part 11a at the positive electrode side and the projection part 11b at the negative electrode side, a current collector 12 at the positive electrode side and a current collector 15 at the negative electrode side are electrically connected, respectively.

The current collector 12 has an upper end part with a plate-shaped part (a plate part 12b1 later described) which is parallel to the upper surface of the electrode assembly 11 (which is parallel to the X-Y plane). The plate-shaped part has a through-hole 12a. The current collector 12 disposed at the positive electrode side which is a first end of the winding axis direction in which the electrode assembly 11 is wound has curved sides (arm parts 12c described later) which are along an outer side surface in the X-axis direction of the projection part 11a and which extend in the Z-axis direction. These curved sides are sandwitched by holding plates 14 made of aluminum or an aluminum alloy together with the projection part 11a at the positive electrode side, and are connected and fixed by ultrasonic welding or the like. The current collector 15 at the negative electrode side also has the same or similar structure, and is formed with cupper or a cupper alloy. The current collector 12 at the positive electrode side and the current collector 15 at the negative electrode side are the same or similar in structure. Thus, only the current collector 12 at the positive electrode side is described, and the current collector 15 at the negative electrode side is not described.

The structure of the current collector 12 (and the current collector 15) is described in detail later.

The Internal Insulation sealing member 13 is an insulation member which Insulates the container 30 and the current collector 12 by being sandwitched between the recess part 21x (see a later-provided description) of the cap part 20 and the base part 12b (see a later-provided description) of the current collector 12. In other words, the internal insulation sealing member 13 is an insulation member which is disposed inside the container 30 and is for insulating the container 30 from the electrode assembly 11 electrically connected via the current collector 12. In addition, the internal insulation sealing member 13 functions as a sealing member (packing) for sealing the through-hole 21a by being pressure-bonded to the through-hole 21a formed in the cap part 20 of the container 30 together with the electrode terminal 23 and the external insulation sealing member 22. The internal insulation sealing member 13 has a shape for covering the base part 12b of the current collector 12 from the side of the electrode terminal 23. The Internal Insulation sealing member 13 is made of a synthetic resin or the like, and has insulation and elastic properties. In addition to the through-hole 21a of the cap part 20 and the through-hole 12a of the current collector 12, the internal insulation sealing member 13 includes a through-hole 13a for allowing penetration of a connection part 23b (later described) of the electrode terminal 23.

The external insulation sealing member 22 is an insulation member which insulates the electrode terminal 23 and the container 30 by being sandwitched between the terminal body 23a (later described) of the electrode terminal 23 and the protrusion part 21 of the cap part 20. In other words, the external insulation sealing member 22 is an insulation member which is disposed outside the container 30 and is for insulating the container 30 from the electrode assembly 11 electrically connected via the electrode terminal 23 and the current collector 12. In addition, the external insulation sealing member 22 functions as a sealing member (packing) for sealing the through-hole 21a by being pressure-bonded to the through-hole 21a formed in the cap part 20 of the container 30 together with the electrode terminal 23 and the internal insulation sealing member 13. The external insulation sealing member 22 is disposed on the plate part 21b of the protrusion part 21, and includes a cylinder-shaped cylinder part 22c which is formed to be in contact with a through-hole 22d in the plate part 22b and to extend below the plate part 22b. In other words, the external insulation sealing member 22 includes the cylinder part 22c and the plate part 22b extending in the direction which is a direction crossing the axis of the cylinder part 22c and outward of the cylinder part 22c.

In addition, the external insulation sealing member 22 includes a side wall part 22a as a second wall part formed at the outer edge of the plate part 22b along the side surface of the protrusion part 21. In other words, the external insulation sealing member 22 is a member including the plate part 22b and the side wall part 22a for covering the outside of the protrusion part 21.

The external insulation sealing member 22 is a member made of a synthetic resin, as in the case of the internal insulation sealing member 13. The through-hole 22d formed in the external insulation sealing member 22 allows penetration of the later-described electrode terminal 23 by means of the connection part 23b, in addition to the through-hole 21a formed in the cap part 20, the through-hole 13a formed in the internal insulation sealing member 13, and the through-hole 12a formed in the current collector 12.

In addition, the cylinder part 22c of the external insulation sealing member 22 is formed at the side (the lower side of the plate part 22b) facing the cap part 20, and has an inner edge which matches the through-hole 22d. In addition, the cylinder part 22c has an outer edge which fits into the through-holes 13a and 21a. Accordingly, the cylinder part 22c is sandwitched between the through-hole 21a formed in the protrusion part 21 of the container 30 and the connection part 23b of the electrode terminal 23. In other words, the external insulation sealing member 22 insulates the electrode terminal 23 and the container 30 by being sandwitched between the terminal body 23a of the electrode terminal 23 and the plate part 21b of the protrusion part 21 of the container 30 and being sandwitched between the connection part 23b of the electrode terminal 23 and the protrusion part area having the through-hole 21a in the cap part 20 of the container 30.

Furthermore, a frame body 22e is formed on the marginal area of the plate part 22b which is of the external insulation sealing member 22 and in which the through-hole 22d is formed.

The electrode terminal 23 includes a plate-shaped terminal body 23a disposed outside the protrusion direction of the protrusion part 21 on the cap part 20 of the container 30 and a column-shaped connection part 23b which penetrates the through-hole 21a formed in the recess part 21x. The terminal body 23a has a flat outer edge corresponding to the shape of the inner edge of the frame body 22e. The connection part 23b takes roles for electrically connecting the terminal body 23a and the current collector 12 and mechanically bonding the cap part 20 and the electrode assembly 11. The electrode terminal 23 disposed at the positive electrode side is made of aluminum or an aluminum alloy, and the electrode terminal disposed at the negative electrode side is made of cupper or a cupper alloy.

The electrode terminal 23 is a member for completing electrical connection between the non-aqueous electrolyte secondary battery 1 and an external load by means of the terminal being fixed by welding onto the surface of the terminal body 23a (the terminal is of the not-shown external load that is, a device which consumes electric energy of the non-aqueous electrolyte secondary battery 1). Otherwise, the electrode terminal 23 is a member for completing electrical connection between a plurality of non-aqueous electrolyte secondary batteries 1 (not-shown) arranged next to each other by means of the terminal bodies 23a of the respective non-aqueous electrolyte secondary batteries 1 being fixed by welding using a bus bar.

Here, the electrode terminal 23 may be configured such that the terminal body 23a and the connection part 23b thereof are made of the same material by forging, casting, or the like. In addition, the electrode terminal 23 may be configured such that the terminal body 23a and the connection part 23b thereof are independent of each other, and that the terminal body 23a and the connection part 23b are integrally formed using two different kinds of materials or the same material.

Figure 2:
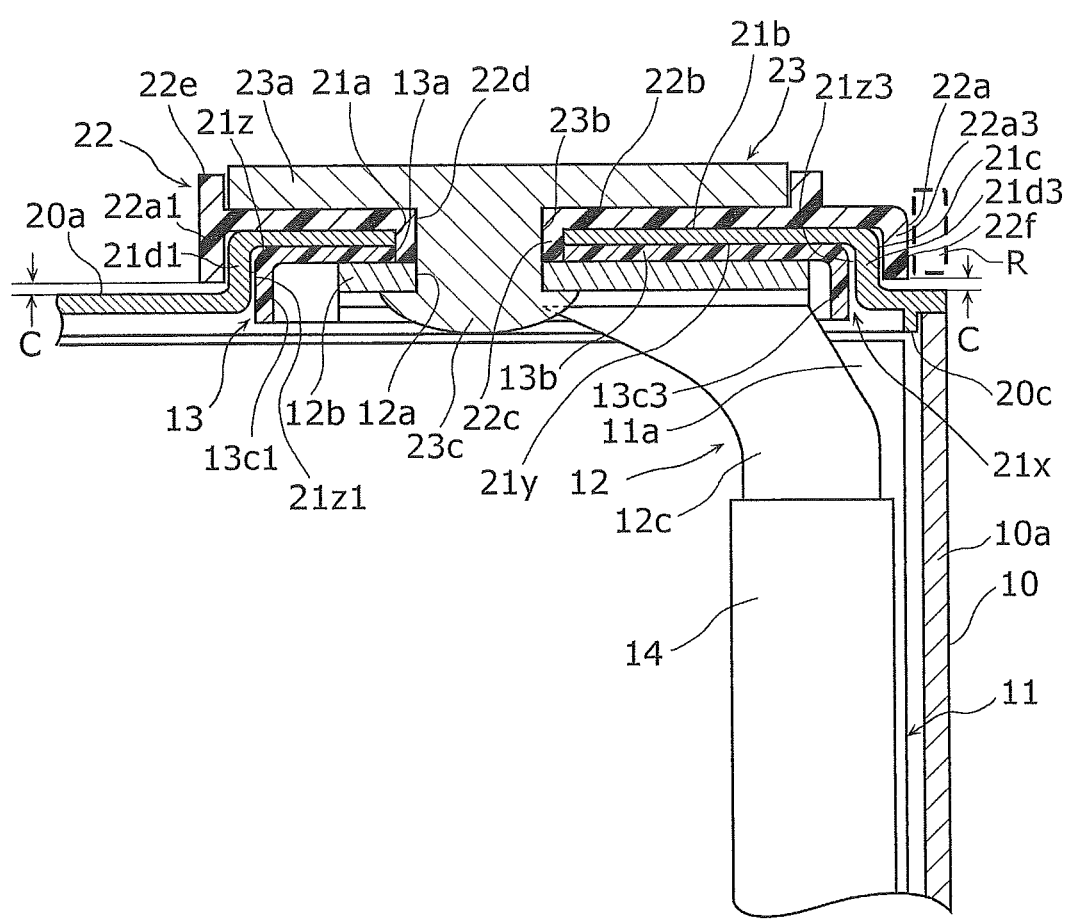
FIG. 2 is a cross-sectional view, in the Y-Z plane, of main parts around one of the electrode terminals of the non-aqueous electrolyte secondary battery.
Figure 3:
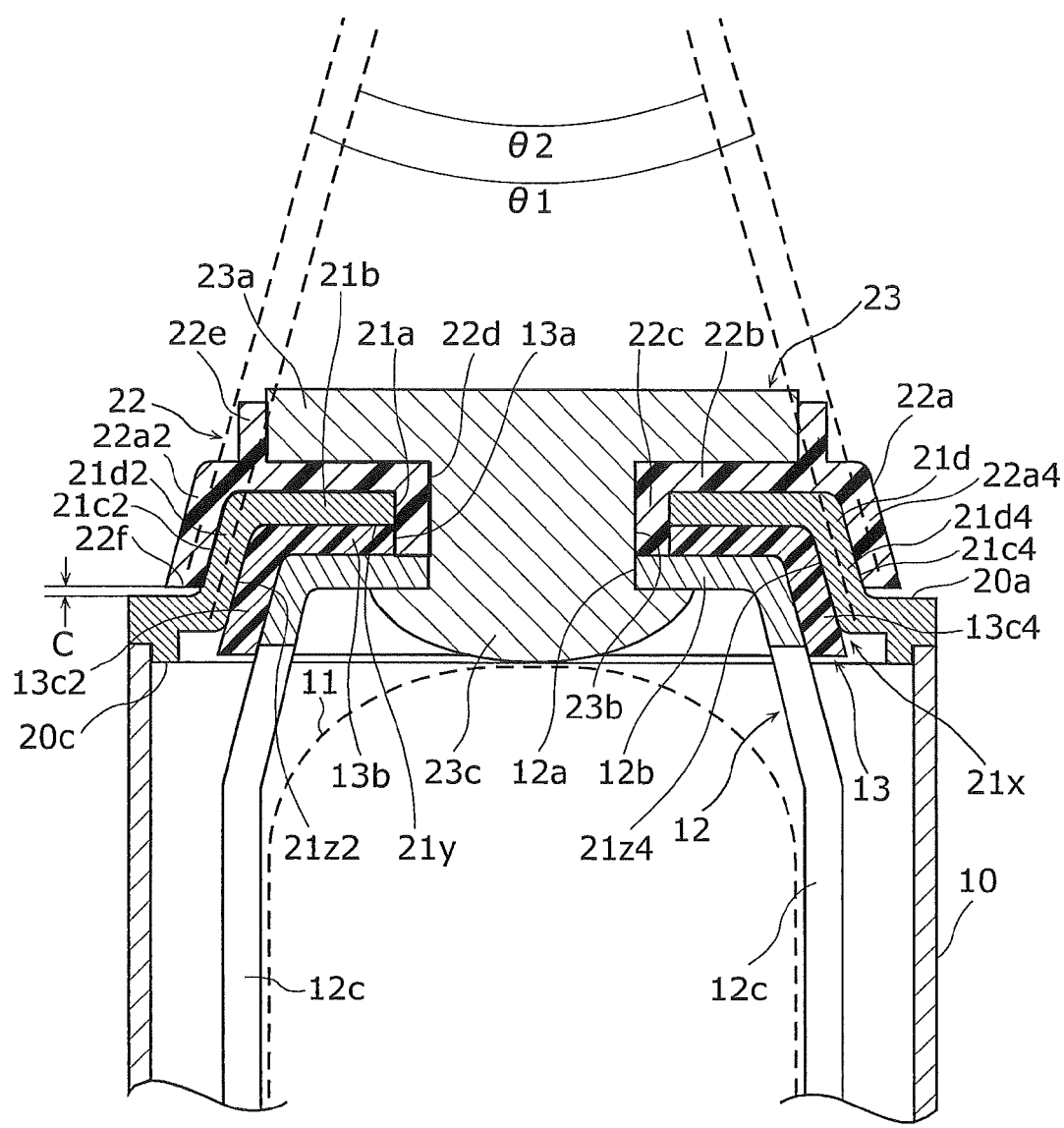
FIG. 3 is a cross-sectional view, in the X-Z plane, of main parts around the electrode terminals of the non-aqueous electrolyte secondary battery.
Figure 3:
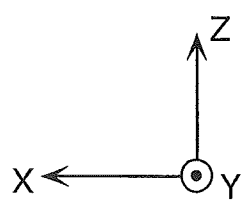

Next, with reference to FIG. 2 and FIG. 3, a detailed description is given of the structure of main parts around the electrode terminal 23 and the current collector 12 of the non-aqueous electrolyte secondary battery 1 according to this embodiment. FIG. 2 is a cross-sectional view, in the Y-Z plane, of main parts around one of the electrode terminals of the non-aqueous electrolyte secondary battery 1 already assembled as shown in FIG. 1. FIG. 3 is a cross-sectional view, in the X-Z plane, of the main parts around the electrode terminal of the non-aqueous electrolyte secondary battery 1 shown in FIG. 1.

As shown in FIG. 2 and FIG. 3, the structure of the main parts around the electrode terminal 23 and the current collector 12 of the non-aqueous electrolyte secondary battery 1 is a stack of the electrode terminal 23, the external insulation sealing member 22, the protrusion part 21 of the cap part 20, the internal insulation sealing member 13, and the plate part 12b1 of the current collector 12 stacked from above in the listed order. The external insulation sealing member 22 is disposed such that the plate part 22b is stacked on a plate part 21b of the protrusion part 21 on a plate part 13b (see a later-provided description) of the internal insulation sealing member 13, and that the cylinder part 22c penetrates through the through-hole 21a formed in the cap part 20 and the through-hole 13a formed in the internal insulation sealing member 13. The cylinder part 22c has an end surface which is on the same plane on which the lower surface of the internal insulation sealing member 13 is present and, together with the lower surface of the internal insulation sealing member 13, is above the upper surface of the plate part 12b1 which forms the principal surface of the current collector 12. The inner circumference of the cylinder part 22c of the external insulation sealing member 22 and the through-hole 12a of the current collector 12 are approximately the same in size and shape. The cylinder part 22c and the through-hole 12a are penetrated by the connection part 23b of the electrode terminal 23. In other words, the outer circumference of the connection part 23b is in contact with the inner circumference of the cylinder part 22c and the through-hole 12a in the current collector 12. The connection part 23b of the electrode terminal 23 has a riveted end 23c formed in the state where the connection part 23b already penetrates through the cylinder part 22c of the external insulation sealing member 22 and the through-hole 12a formed in the current collector 12. In other words, the electrode terminal 23 having the riveted end 23c as a pressure-bonding end part for sandwitching and pressure-bonding, in the recess part 21x, the cap part 20 of the container 30 and the current collector 12 etc. together with the terminal body 23a, and is thereby electrically connected to the current collector 12.

Since the outer diameter of the riveted end 23c is larger than the diameters of the respective through-holes 21a, 22d, 13a, and 12a, the external insulation sealing member 22, the cap part 20, the internal insulation sealing member 13, and the current collector 12 are pressure-bonded to each other and integrally fixed by being sandwitched by the terminal body 23a of the electrode terminal 23 and the riveted end 23c. In this way, the electrode terminal 23 pressure-bonds the protrusion part 21 of the container 30 and the external insulation sealing member 22, and thereby seals the protrusion part area having the through-hole 21a in the cap part 20 of the container 30 and the electrode terminal 23, using the external insulation sealing member 22 and the internal insulation sealing member 13. In addition, since the electrode terminal 23 is in contact with the current collector 12 at the connection part 23b and the riveted end 23c, the electrode terminal 23 is electrically connected to the current collector 12 in a state where the electrode terminal 23 already penetrates through the protrusion part 21 of the cap part 20 via the through-hole. Here, since the side surface of the connection part 23b is covered by the cylinder part 22c of the external insulation sealing member 22, the cap part 20 and the connection part 23b are securely in an Insulated state.

Next, the structures of the respective parts are described.

As shown in FIG. 2 and FIG. 3, the cap part 20 in this embodiment is formed to have, on the back side (the lower side), a frame part 20c having an outer shape matching the inner edge shape of an opening 10x of the container body 10 so as to fit into the opening 10x. The frame part 20c is formed inside the side end which is of the cap part 20 and abuts the upper end surface of the container body 10. In other words, the cap part 20 is configured to have a larger thickness in the area with the frame part 20c than in the other area of the cap part 20. In addition, the cap part 20 other than the protrusion part 21 has the largest thickness in the area with the frame part 20c, the second largest thickness in the area outside the frame part 20c, and the smallest thickness in the area inside the frame part 20c.

In addition, each of the structural members of the cap part 20 has a cross section having an approximately even thickness. The cap part 20 has a recess part 21x corresponding to the protrusion part 21, at the back side of the protrusion part 21. In other words, the protrusion part 21 of the cap part 20 is formed, for example, by pressing plate-shaped member having an even thickness to form a protrusion and a recess therein. In other words, the container 30 includes the cap part 20 having the protrusion part 21 and also having the recess part 21x formed at the position which is in the inner surface of the wall of the container 30 and corresponds to the position of the protrusion part 21 when the protrusion part 21 is formed. The recess part 21x includes a bottom surface 21y which is the lowermost surface, and a side surface 21z as an inner side surface continuously formed between the bottom surface 21y and the inner surface of the wall of the container 30. Accordingly, the cap part 20 includes a side wall part 21d which forms a side surface 21c as the outer side surface of the protrusion part 21 and a side surface 21z of the recess part 21x. As shown in FIG. 2 and FIG. 3, in a plan view, the side wall part 21d is formed (i) to be continuous from the outer edge of the rectangular-shaped plate part 21b to the cap body 20a along the lateral direction (X-axis direction) of the cap part 20 and the longitudinal direction (Y-axis direction), and along a direction crossing the cap body 20a. The side wall part 21d has four side portions 21d1, 21d2, 21d3, and 21d4 facing four directions. Adjacent ones of the four side portions 21d1, 21d2, 21d3, and 21d4 are continuous to each other. Among the four side portions 21d1, 21d2, 21d3, and 21d4, the paired side portions 21d1 and 21d3 continuous to the outer edge in the lateral direction (X-axis direction) of the plate part 21b of the protrusion part 21 are formed to be bent perpendicularly with respect to the cap body 20a and the plate part 21b (see FIG. 2). In addition, among the four side portions 21d1, 21d2, 21d3, and 21d4, the paired side parts 21d2 and 21d4 continuous to the outer edge in the longitudinal direction (Y-axis direction) of the plate part 21b of the protrusion part 21 are formed by being bent so as to be farther apart from each other at the positions closer to the cap body 20a (see FIG. 3). In other words, the first side wall 21c2 and the second side wall 21c4 at the inner side in the X-axis direction of the paired side portions 21d2 and 21d4 in the Y-axis direction of the side wall part 21d are tilted so as to be farther apart from each other at the positions closer to the upper surface 20b of the cap part 20. The side surface 21z of the recess part 21x is a surface which faces the paired wall parts 12b2 (later described) of the base part 12b of the current collector 12 through the side wall parts 13c (later described) of the internal insulation sealing member 13.

The internal insulation sealing member 13 has a plate part 13b and a side wall part 13c as a first wall part, similarly to the protrusion part 21 formed in the cap part 20. The internal insulation sealing member 13 has an upper-part shape corresponding to the shape of the recess part 21x. The plate part 13b has the shape of a flat plate parallel to the plate part 21b of the protrusion part 21, and, in a plan view, has the shape of a rectangle with the sides each parallel to the X-axis direction or Y-axis direction. The plate part 13b includes the aforementioned through-hole 13a formed therein. The side wall part 13c is formed to perpendicularly extend from the outer edge of the plate part 13b toward the electrode assembly 11 (that is, downward). The side wall part 13c has four side parts of 13c1, 13c2, 13c3, and 13c4 facing four directions. Adjacent ones of the four side parts 13c1, 13c2, 13c3, and 13c4 are continuous to each other. The side wall part 13c is parallel to the inner surface of the aforementioned side wall part 21d. In other words, among the four side parts 13c1, 13c2, 13c3, and 13c4, the paired side parts 13c1 and 13c3 respectively extending from the paired side parts in the X-axis direction of the plate part 13b are formed to be perpendicular to the plate part 13b. Among the four side parts 13c1, 13c2, 13c3, and 13c4, the paired side parts 13c2 and 13c4 are formed to respectively extend, with a tilt, from the paired side parts in the Y-axis direction of the plate part 13b, so as to be farther apart from each other at positions more distant from the plate part 13b. As shown in FIG. 3, the inner surfaces of the paired side portions 21d2 and 21d4 facing each other and the outer surfaces of the paired side parts 13c2 and 13c4 are in contact with each other. The paired side portions 21d2 and 21d4 among the side portions of the side wall part 21d are continuous from the outer edge in the longitudinal direction of the plate part 21b of the protrusion part 21, and the paired side parts 13c2 and 13c4 extend from respectively corresponding two of the side portions in the Y-axis direction of the plate part 13b of the internal insulation sealing member 13.

In other words, the at least part of the side surface 21z of the recess part 21x is in surface contact with the paired parts 13c2 and 13c4 which are at least parts of the side wall part 13c of the internal insulation sealing member 13. In addition, the at least part of the side surface 21z is formed to be tilted with respect to the direction in which the protrusion part 21 protrudes. Here, the at least part of the side surface 21z of the recess part 21x is paired portions 21z2 and 21z4 facing each other in the side surface 21z, and the paired portions 21z2 and 21z4 are tilted so as to be farther apart from each other at positions more distant from the bottom surface 21y. In addition, the paired portions 21z2 and 21z4 facing each other in the side surface 21z are formed to be tilted symmetrically with respect to the direction in which the protrusion part 21 protrudes, along the longitudinal direction of the cap part 20.

Furthermore, the external Insulation sealing member 22 positioned at the upper part of the protrusion part 21 of the cap part has a shape corresponding to the shape of the protrusion part 21 as in the case of the internal insulation sealing member 13. In the external insulation sealing member 22, the lower surface of the plate part 22b is in contact with the upper surface of the plate part 21b of the protrusion part 21, and the side wall part 22a extending from the outer edge of the plate part 22b and below the bottom part of the plate part 22b has a shape matching the shape of the side wall part 21d which forms the side surface of the protrusion part 21. The side wall part 22a has four side parts 22a1, 22a2, 22a3, and 22a4 facing four directions. Adjacent ones of the four side parts 22a1, 22a2, 22a3, and 22a4 are continuous to each other. Among the four side parts 22a1, 22a2, 22a3, and 22a4, the paired side parts 22a1 and 22a3 which extend downward from the paired side parts in the X-axis direction of the plate part 22b are formed to be perpendicular to the plate part 22b. Among the four side parts 22a1, 22a2, 22a3, and 22a4, the paired side parts 22a2 and 22a4 which extend downward from the paired side parts in the Y-axis direction of the plate part 22b are tilted so as to be farther apart from each other at positions closer to the upper surface 20b of the cap part 20 of the container 30. In other words, the side wall part 22a of the external insulation sealing member 22 includes: a part 22a2 of the side wall part 22a as the first side wall part disposed along the part (the first side wall 21c2) of a side surface of a first protrusion part 21; and a part 22a4 of the side wall part 22a as the second side wall part disposed along the part (the second side wall 21c4) of a side surface of a second protrusion part 21 which is disposed at the side opposite to the first side wall part. Here, the first angle θ1 formed by the part 22a2 and the part 22a4 of the side wall part 22a is equal to the second angle θ2 formed by the first side surface 21c2 and the second side surface 21c4. In other words, the inner surface of the part 22a2 in the X-axis direction of the side wall part 22a and the first side wall 21c2 are closely in contact with each other, and the inner surface of the part 22a4 in the X-axis direction of the side wall part 22a and the second side wall 21c4 are closely in contact with each other.

In addition, the distance in the Z-axis direction between the lower surface of the plate part 22b and the bottom end of the side wall part 22a is less than the distance in the Z-axis direction from the upper surface 20b of the cap body 20a to the upper surface of the plate part 21b of the protrusion part 21. In other words, as shown in FIG. 2 and FIG. 3, in the state where the external Insulation sealing member 22, the cap part 20, the internal insulation sealing member 13, and the current collector 12 are sandwitched by the terminal body 23a of the electrode terminal 23 and the riveted end 23c and thereby being pressure-bonded to each other, the end surface 22f of the end part of the side wall part 22a (that is, the lower end of the side wall part 22a) at the side of the upper surface 20b of the cap part 20 of the container 30 is apart from the upper surface 20b of the cap part 20 by a predetermined spacing C.

In this way, in the non-aqueous electrolyte secondary battery 1 in this embodiment, the cap part 20 has a protrusion part 21 and a corresponding recess part 21x, and the external insulation sealing member 22 and the internal insulation sealing member 13 have shapes matching the shapes of the protrusion part 21 and the recess part 21x.

Figure 4:
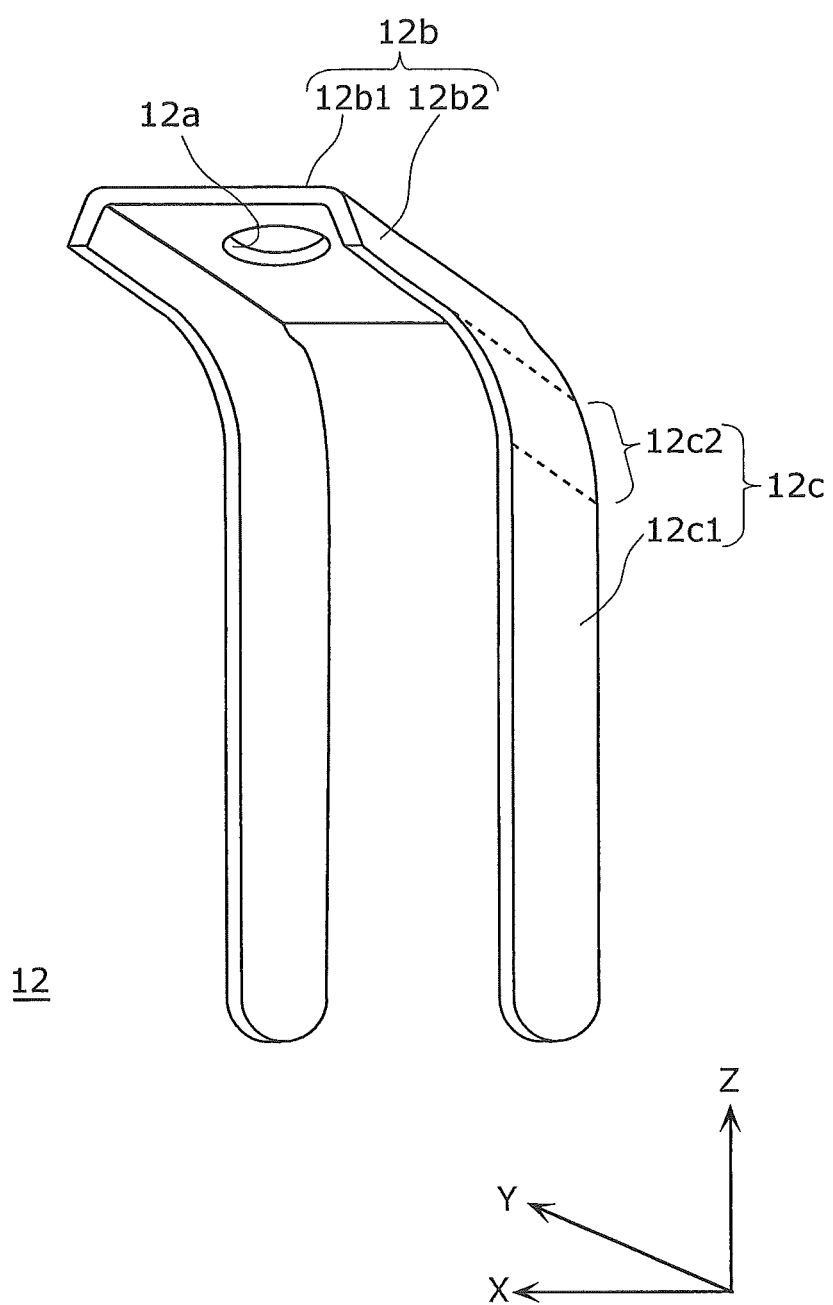
FIG. 4 is a perspective view of one of the current collectors of the non-aqueous electrolyte secondary battery.

Next, with reference to FIG. 4, FIGS. 5A and 5B, the structure of the current collector 12 is described in detail. FIG. 4 is a perspective view looking up the current collector 12. FIG. 5A is a view in the Y-axis direction, and FIG. 5B is a view in the X-axis direction.

As shown in the diagrams, the current collector 12 is formed by, for example, press-bending a single metal plate, and includes a base part 12b including a part having a flat plate shape, and paired arm parts 12c which extend downward from both the ends in the X-axis direction of the base part 12b. In addition, the base part 12b of the current collector 12 is connected to the electrode terminal 23 in the recess part 21x. The arm part 12c of the current collector 12 extends from the base part 12b toward the side opposite to the protrusion direction of the protrusion part 21 (that is, below the cap part 20), and is connected to the electrode assembly 11.

As shown in FIG. 4 and FIG. 5A, the base part 12b includes a flat-plate shaped plate part 12b1 having a through-hole 12a formed therein, and paired wall parts 12b2 formed by bending at paired sides in the Y-axis direction of the plate part 12b1. The plate part 12b1 is directly connected to the electrode terminal 23. The plate part 12b1 is formed along the bottom surface 21y of the recess part 21x. The paired wall parts 12b2 are formed continuously from opposing sides of the plate part 12b1 such that the paired wall parts 12b2 have inner ends facing the side surface 21z of the recess part 21x. The paired wall parts 12b2 included in the base part 12b are tilted so as to be farther apart from each other at positions more distant from the plate part 12b1, facing, at its inner ends, the side surface 21z which is the inner surface of the side wall part 21d of the recess part 21x in the cap part 20 shown in FIG. 3. Each of the paired wall parts 12b2 is continuous to the corresponding one of the paired arm parts 12c at its end part in the Y-axis direction of the container 30 (the right side in FIG. 5B). In other words, the respective wall parts 12$b$2 are continuous to the arm part 12$c$ at only portions thereof closer to the projection part 11$a$ of the electrode assembly 11. In other words, the arm part 12$c$ of the current collector 12 is continuous from the paired wall parts 12$b$2, and extends from the base part 12$b$ downward and below the cap part 20.

Next, each of the paired arm parts 12$c$ includes an arm body 12$c$1 connected to the electrode assembly 11 and a bridge part 12$c$2 which bridges the arm body 12$c$1 and the wall parts 12$b$2. Each of the paired arm bodies 12$c$1 is a long flat plate which extends from the plate part 12$b$1 downward in the direction orthogonal to the plate part 12$b$1 along the side surface of the projection part 11$a$ in the X-axis direction at the positive electrode side of the electrode assembly 11. In short, the paired arm bodies 12$c$1 are parallel to each other. As shown in FIG. 3, the paired arm bodies 12$c$1 sandwitch the electrode assembly 11 therebetween. The arm part 12$c$ of the current collector 12 is connected to the electrode assembly 11 at a position in the Y-axis direction closer to the short side surface 10$a$ of the container 30 than to the position of the protrusion part 21 inside the container 30. In addition, the bridge part 12$c$2 connects the arm body 12$c$1 and the wall parts 12$b$2 of the base part 12 by being, when viewed in the X-axis direction, curved from the recess part 21$x$ toward the side of the short side surface 10$a$ of the container 30. In other words, as shown in FIG. 58B, in the Y-axis direction of the container 30, an edge e2 which is of the arm part 12$c$ of the current collector 12 and at the side of the short side surface 10$a$ is positioned closer to the short side surface 10$a$ than an edge e1 which is of the base part 12$b$ of the current collector 12 and at the side of the short side surface 10$a$.

Here, as shown in FIG. 5B, the end portions of the paired arm bodies 12$c$1 are round when seen from a viewpoint in the X-axis direction. By configuring the arm bodies 12$c$1 to have round end portions, it is prevented that the surface of the electrode assembly 11 is damaged when the electrode assembly 11 is connected to the current collector 12. It is to be noted that the arm bodies 12$c$1 may be configured to have rectangular end portions instead of round end portions.

On the other hand, as shown in FIG. 5A, each of the paired bridge parts 12$c$2 has the same angle with respect to the plate part 12$b$1 of the base part 12$b$ as the angle of the wall part 12$b$2 with respect to the plate part 12$b$1 of the base part 12$b$. In other words, the bridge parts 12$c$2 are paired structural elements of the current collectors 12 formed along the lines extending from the paired wall parts 12$b$2. The paired wall parts 12$b$2 of the base part 12$b$ are formed continuously from the bridge parts 12$c$2, and are bent with respect to the plate part 12$b$1 of the base part 12$b$. In addition, the paired wall parts 12$b$2 of the base part 12$b$ face the side surface 21$z$ of the recess part 21$x$ through the side wall part 13$c$ of the internal insulation sealing member 13. The paired bridge parts 12$c$2 are tilted so as to be farther apart from each other at the positions closer to the bottom part. In addition, the wall parts 12$b$2 of the base part 12$b$ is in surface contact with the side wall part 13$c$ of the internal insulation sealing member 13. Since the paired wall parts 12$b$2 and the paired bridge parts 12$c$2 are tilted in this way, each of the plate parts 12$b$1 directly in contact with the plate parts 13$b$ of the internal insulation sealing members 13 has, in the X-axis direction of the upper surface of the plate part 12$b$1, a width W1 smaller than the spacing W2 between the paired arm bodies 12$c$1. Since the wall parts 12$b$2 and the bridge parts 12$c$2 are formed along the extension lines, and the arm parts 12$c$ and the base parts 12$b$ of the current collector 12 are integrally formed, it is easy to form the arm parts 12$c$ and base parts 12$b$ of the current collectors 12 having sufficient strength and form the paired arm parts 12$c$ precisely.

In addition, as shown in FIG. 2, FIG. 4, and FIG. 5B, the bridge part 12$c$2 extends from the wall part 12$b$2 of the base part 12$b$ in the direction toward the Y-axis direction end part of the container 30 such that the arm body 12$c$1 is positioned at the Y-axis direction end part side of the container 30. In this way, the outer side of the arm body 12$c$1 extends to a point outer than an outer end e1 of the plate part 12$b$1.

In the non-aqueous electrolyte secondary battery 1 according to this embodiment, the paired portions 21$z$2 and 21$z$4 and the paired portions 13$c$2 and 13$c$4 are formed to be tilted with respect to the direction in which the protrusion part 21 protrudes and to be parallel to each other. The paired portions 21$z$2 and 21$z$4 are formed to face each other in the side surface 21$z$ as the inner side surface of the recess part 21$x$ formed on the inner surface of the wall of the container 30, and the paired portions 13$c$2 and 13$c$4 are of the side wall part 13$c$ of the internal insulation sealing member 13 and respectively face the paired portions 21$z$2 and 21$z$4. In addition, the paired portions 21$z$2 and 21$z$4 in the side surface 21$z$ of the recess part 21$x$ are tilted so as to be farther apart from each other at positions more distant from the bottom surface 21$y$. Furthermore, the paired portions 21$z$2 and 21$z$4 in the side surface 21$z$ of the recess part 21$x$ are in surface contact with the paired portions 13$c$2 and 13$c$4 in the side surface 13$c$ of the internal insulation sealing member 13.

For this reason, even when the recess part 21$x$ or the internal insulation sealing member 13 is formed to have an allowable size difference, it is possible to easily bring into close contact the paired portions 21$z$2 and 21$z$4 in the side surface 21$z$ of the recess part 21$x$ and the paired portions 13$c$2 and 13$c$4 in the side wall part 13$c$ of the internal insulation sealing member 13, and thereby can increase the air-tightness around the electrode terminal 23.

In particular, the tilted paired parts 13$c$2 and 13$c$4 in the side wall part 13$c$ of the internal insulation sealing member 13 and the tilted paired portions 21$z$2 and 21$z$4 in the side surface 21$z$ of the recess part 21$x$ are formed along the longitudinal direction of the Internal insulation sealing member 13 which is rectangular in a plan view and the recess part 21$x$. For this reason, it is possible to secure a wide close-contact area between the recess part 21$x$ and the internal insulation sealing member 13. In this way, it is possible to achieve bonding with a higher air-tightness.

In addition, since the paired parts 13$c$2 and 13$c$4 in the side wall part 13$c$ and the paired portions 21$z$2 and 21$z$4 in the side surface 21$z$ are tilted so as to be farther apart from each other at positions more distant from the cap part 20, it is possible to produce a space in which the wall parts 12$b$2 of the base part 12$b$ of the current collector 12 to be bonded at that part are also tilted in the same direction. In other words, it is possible to form the paired arm parts 12$c$ for sandwiching the electrode assembly 11 to extend downward from the base part 12$b$ of the current collector 12 with a spacing which is secured in advance in a predetermined direction of the base part 12$b$ of the current collector 12. In this way, it is possible to form the paired arm parts 12$c$ of the current collector 12 to have a spacing W2 larger than a width W1 in the X-axis direction of the base part 12$b$. For this reason, it is possible to secure a large width in the X-axis direction of the electrode assembly 11, and a large space for the electrode assembly 11 to be housed in the container 30. Thus, as an advantageous effect, it is possible to increase the housing efficiency with respect to the capacity of the container 30 of the electrode assembly 11.

In the non-aqueous electrolyte secondary battery 1 according to this embodiment, the container 30 includes a protrusion part 21 formed thereon, and further includes a recess part 21x formed, when the protrusion part 21 is formed, at the position which is on an inner surface of the container 30 and corresponds to the position of the protrusion part 21. The current collector 12 electrically connected to the electrode terminal 23 inside the container 30 includes a base part 12b connected to the electrode terminal 23 inside the recess part 21x.

In this way, the base part 12b at which the current collector 12 is connected to the electrode terminal 23 is housed in the recess part 21x formed in the container 30. Thus, it is possible to match the space for parts other than the recess part 21x in the inner space of the container 30 to the shape of the electrode assembly 11. In this way, it is possible to reduce wasteful space produced when the electrode assembly 11 is housed inside the container 30 only by adjusting the outer size of the electrode assembly 11 to the size of the inner space. In this way, the shape of the container 30 is adjusted to the shape of the electrode assembly 11 without changing the structure of the electrode assembly 11. Therefore, it is possible to easily increase the housing efficiency of the electrode assembly 11 with respect to the inner space of the container 30.

In addition, in the non-aqueous electrolyte secondary battery 1 according to this embodiment, the recess part 21x formed in the cap part 20 has side surfaces 21z in which paired portions 21z2 and 21z4 facing the paired first wall parts 12b2 of the base part 12b of the current collector 12 are tilted so as to be farther apart from each other at positions more distant from a bottom surface 21y of the recess part 21x, as in the case of the paired first wall parts 12b2. In other words, it is possible to bond the recess part 21x and the base part 12b of the current collector 12 more strongly by configuring the recess part 21x to have side surfaces 21z in which the paired portions 21z2 and 21z4 facing the paired first wall parts 12b2 of the base part 12b are tilted suitably for the tilted paired first wall parts 12b2 of the base part 12b of the current collector 12, as in the case of the paired first wall parts 12b2. In addition, it is possible to secure a wide space for housing a bonding tool used to bond the electrode terminal 23 and the base part 12b of the current collector 12. Thus, it is possible to increase the operability in the manufacturing.

In addition, in the non-aqueous electrolyte secondary battery 1 according to this embodiment, the bridge parts 12c2 which are continuous from the base part 12b of the current collector 12 to the arm parts 12c are flat plates which are formed (i) integrally with the plate part 12b1 and the paired wall parts 12b2 and (ii) to have a shape matching the shape of the inner surface of the recess part 21x. For this reason, it is possible to reduce the distance from the arm bodies 12c1 to the plate part 12b1 as much as possible, and shorten the current collection path. For this reason, it is possible to reduce internal loss in the current collector 12. In addition, since it is easy to form the current collector 12 having the flat plate-shaped bridge parts 12c2, it is possible to reduce mechanical stress added onto the current collector 12 itself.

In addition, in the non-aqueous electrolyte secondary battery 1 according to this embodiment, the base part 12b includes the plate part 12b1 and the paired wall parts 12b2 which are bent with respect to the plate part 12b1, and the paired wall parts 12b2 are formed continuously with the paired bridge parts 12c2 of the paired arm bodies 12c. For this reason, it is possible to increase the strength of the base part 12b of the current collector 12, and prevent deformation of the arm parts 12c.

Figure 6:
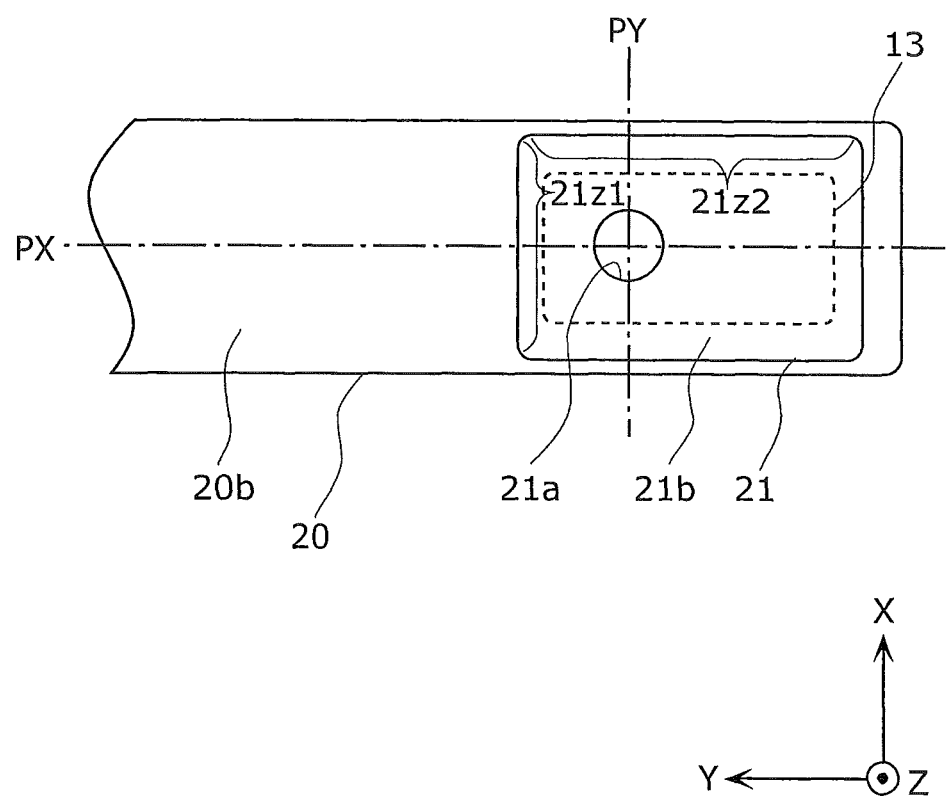
FIG. 6 is a partial plan view schematically showing components around a cap part of the non-aqueous electrolyte secondary battery.

In addition, in the non-aqueous electrolyte secondary battery 1 according to this embodiment, the paired portions 21z2 and 21z4 facing each other in the side surface 21z of the recess part 21x are tilted symmetrically with respect to the direction in which the protrusion part 21 protrudes. In other words, as shown in FIG. 6, when the recess part 21x and the internal insulation sealing member 13 has a rectangular outer shape in a plan view, the portions passing through the straight line PX in the diagram are symmetrical to each other in the lateral direction, and the portions passing through the straight line PY in the diagram are symmetrical to each other in the longitudinal direction.

In this way, for example, by forming the paired portions 21z2 and 21z4 to have a shape symmetrical to each other, it is possible to easily match the recess part 21x and the internal insulation sealing member 13 even if one of the orientation of the recess part 21 and the orientation of the internal insulation sealing member 13 changes by 180 degrees with respect to the other when the cap part 20 and the internal insulation sealing member 13 are assembled. In other words, it is possible to easily align the recess part 21x and the internal insulation sealing member 13.

In addition, in the non-aqueous electrolyte secondary battery 1 according to this embodiment, the paired portions 21c2 and 21c4 and the paired portions 22a2 and 22a4 are formed to be tilted with respect to the direction in which the protrusion part 21 protrudes and to be parallel to each other. The paired portions 21a2 and 21a4 are of at least part of the side surface 21c of the protrusion part 21 formed on the outer surface of the container 30, and the paired portions 22a2 and 22a4 are of the side wall part 22a of the external insulation sealing member 22 and respectively face the paired portions 21c2 and 21c4. In addition, the paired portions of the side surface 21c of the protrusion part 21 are tilted so as to be farther apart from each other at positions more distant from the plate part 21b as the top surface of the protrusion part 21. For this reason, even when each of the protrusion part 21 and the external insulation sealing member 22 is formed to have an allowable size difference, it is possible to easily bring into close contact the paired portions 21c2 and 21c4 in the side surface 21c of the protrusion part 21 and the paired portions 22a2 and 22a4 in the side wall part 22a of the external insulation sealing member 22, and thereby can increase the air-tightness around the electrode terminal 23.

However, the present invention is not limited to the above embodiment.

In the non-aqueous electrolyte secondary battery 1, the side surface 21z of the recess part 21x is formed such that (i) the paired portions 21z1 and 21z3 along the X-axis direction of the bottom surface 21y of the recess part 21x are bent vertically with respect to the cap body 20a and that (ii) the paired portions 21z2 and 21z4 along the Y-axis direction of the bottom surface 21y of the recess part 21x are bent so as to be farther apart from each other at the positions more distant from the bottom surface 21y. However, this is exemplary and non-limiting. As another example, the paired portions along the X-axis direction of the bottom surface 21y may be formed to be bent so as to be farther apart from each other at positions more distant from the bottom surface 21y, and the paired portions along the Y-axis direction of the bottom surface 21y may be formed to be bent vertically with respect to the bottom surface 21y.

It is assumed here that the side wall part 13c of the internal insulation sealing member 13 is formed to have a shape matching the shape of the side surface 21z of the recess part 21x, and, as in the above case, that the paired portions 13c1 and 13c3 along the X-axis direction of the side wall part 13c are vertical to the plate part 13b, and that the paired portions 13c2 and 13c4 along the Y-axis direction are tilted. However, this is exemplary and non-limiting. In short, as in the above case, the paired portions along the X-axis direction of the side wall part 13c and the paired portions along the Y-axis direction of the same have an interchangeable relationship. Accordingly, the side wall part 13c of the internal insulation sealing member 13 may be vertical in the Y-axis direction and may be tilted in the X-axis direction.

In addition, the side surface 21z of the recess part 21x and the side wall part 13c of the internal insulation sealing member 13 may be tilted in both the Y-axis direction and the X-axis direction. Furthermore, only at least one of the side portions of each of the side wall part 21d and the side wall part 13c may be tilted.

Figure 7:
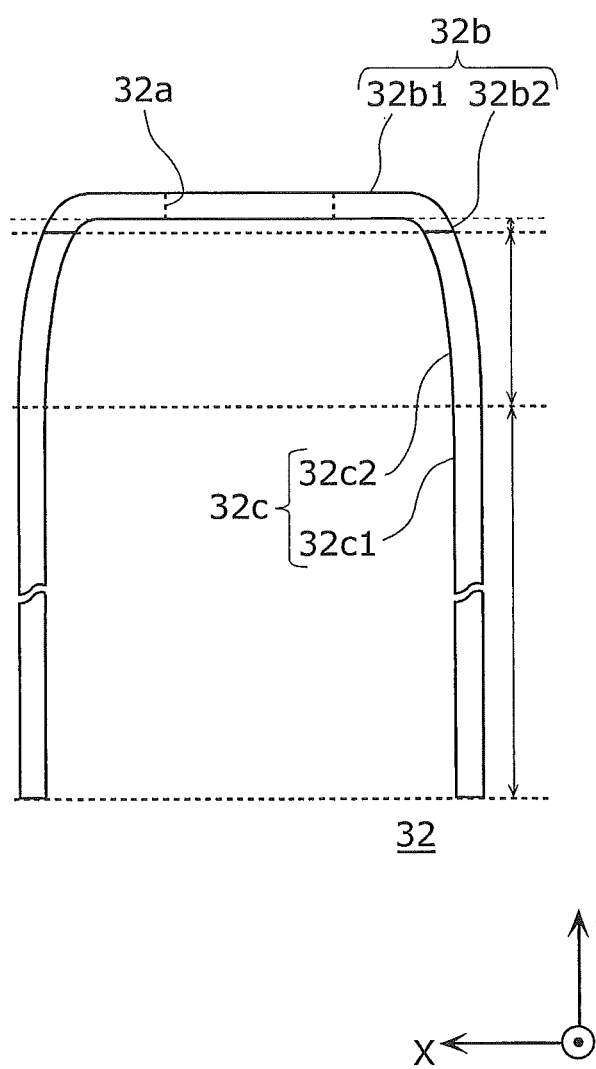
FIG. 7 is a view of one of exemplary current collectors when viewed in the Y-axis direction in a non-aqueous electrolyte secondary battery according to the present invention.
Figure 8:
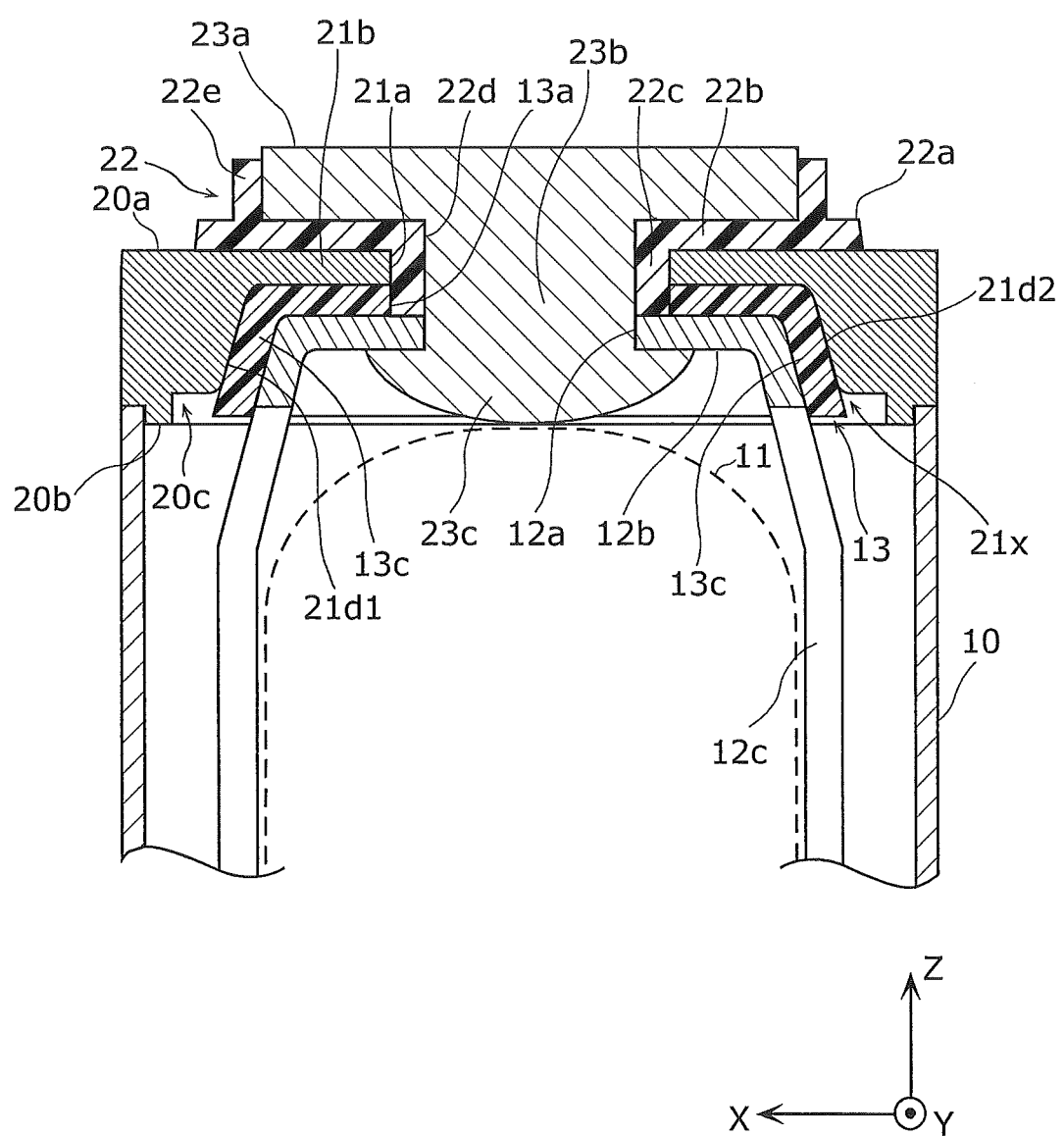
FIG. 8 is a cross-sectional view of components around one of the electrode terminals of a non-aqueous electrolyte secondary battery having another structure according to the present invention.

As shown in FIG. 5A, it is assumed here that, in the non-aqueous electrolyte secondary battery 1 according to this embodiment, the bridge parts 12c2 of the arm parts 12c of the current collector 12 when viewed in the Y-axis direction are continuous from the paired wall parts 12b2 and the paired arm bodies 12c1 and have a bent along the inner shape of the recess part 21x. However, the bridge parts 12c2 do not always need to be continuous and have a bent in such a manner. For example, as shown in FIG. 7, the bridge parts 32c2 of the arm parts 32c of the current collector 32 may have a curve along the paired wall part 32b2 of the base part 32b and the paired arm bodies 32c1. In this case, the bridge parts 32c2 when viewed in the Y-axis direction are approximated more closely to the outer shape of the electrode assembly 11 when viewed in the Y-axis direction. Thus, it is possible to further increase the housing efficiency. In addition, since it is possible to form the bridge parts 12c2 to have curved surfaces instead of flat surfaces, it is possible to provide the bridge parts 12c2 having a rigidity larger than a rigidity obtainable when forming the bridge parts 12c2 to have a shape with a bent at the boundaries between the paired wall parts 12b2 and the paired arm bodies 12c1 when viewed in the Y-axis direction of the current collector 12. It is to be noted that the structural elements assigned with numerical references starting with 32 of the current collector 32 shown in FIG. 7 are not described here because the descriptions provided for the structural elements assigned with numerical references starting with 12 can be substituted.

In the non-aqueous electrolyte secondary battery 1 in this embodiment, the recess part 21x of the cap part 20 is a recess formed to have a shape inverse to the shape of the protrusion part 21 formed on the upper surface 20b of the cap part 20. However, the recess part 21x in the present invention may be formed irrespective of the presence or absence of the protrusion part 21. More specifically, the upper surface may be a flat surface without any protrusion part, and a cap part may be employed which has a recess part 21x formed by performing a process such as pressing or cutting onto the back surface opposite to the upper surface. Even with the configuration, it is possible to increase the housing efficiency of the electrode assembly 11. In addition, since the part other than the recess part 21x of the cap part 20 has a larger thickness, it is possible to increase the rigidity of the cap part 20 and to increase the strength of the non-aqueous electrolyte secondary battery.

However, it is preferable to form the protrusion part 21 when forming the recess part 21x because the following advantageous effects can be obtained. Disposing the electrode terminal 23 on the upper surface of the protrusion part 21 used as the protrusion part according to the present invention facilitates positioning of the electrode terminal 23, which makes it possible to increase the productivity.

In addition, the electrode assembly in the present invention is a winding-type electrode assembly in the above description, but may be a stacking-type electrode assembly.

In addition, the energy storage element is the non-aqueous electrolyte secondary battery 1 represented by the lithium ion secondary battery in the above description, but may be any other secondary battery such as a nickel hydrogen battery which can charge and release electric energy as electrochemical reactions. Alternatively, the energy storage element may be a primary battery. Furthermore, the energy storage element may be an element for directly storing electricity as charge, such as an electric double-layer capacitor. In short, the energy storage element in the present invention may be any element for storing electricity, and thus the present invention is not limited to the energy storage elements of specific types.

In addition, in the above description, the battery container including the container body 10 and the cap part 20 corresponds to an element container in the present invention, and the electric terminals are provided on the cap part 20. However, the present invention may be implemented as an energy storage element having electric terminals at the side of a container body. In short, the present invention can be implemented as an energy storage element arbitrarily configured, as long as the energy storage element includes a base part of the current collector disposed inside a recess part formed at an arbitrary position inside the element container. Accordingly, the present invention is not limited to the states of the connection between the cap part and container body of the element container, and the kinds, shapes, number of the members of the element container.

In addition, the battery body is made of aluminum, but may contain an aluminum alloy, any other metal such as a stainless steel, or a metal compound. In addition, the battery has a hexahedral shape in appearance, but may have a cylindrical shape instead. In short, the element container according to the present invention is not limited to element containers having specific configurations in terms of shapes, materials, and so on.

To sum up, the present invention may be implemented by adding various kinds of modifications to the above embodiment, in addition to the aforementioned variations, within the scope of the present invention.

INDUSTRIAL APPLICABILITY

The present invention as described above provides an advantageous effect of allowing a large tolerance and thereby making it easier to manufacture energy storage elements and thus is applicable to energy storage elements such as secondary batteries.

The invention claimed is:
1. An energy storage element, comprising:
a container that includes a container body including an opening and a cap part formed on the opening;
an electrode assembly housed in the container;
an electrode terminal; and
a current collector which electrically connects the electrode terminal and the electrode assembly,
wherein the cap part of the container comprises:

an outer surface including a protrusion part formed to protrude outward from the outer surface; and an inner surface comprising a recess part formed at a position corresponding to a position of the protrusion part, the recess part comprising:

a bottom surface which is outermost; and an inner side surface formed continuously between the bottom surface and the inner surface of the cap part, at least part of the inner side surface of the recess part being formed to be tilted with respect to a direction in which the protrusion part protrudes.

2. The energy storage element according to claim 1, wherein the electrode terminal comprises a terminal body disposed outside the protrusion part.

3. The energy storage element according to claim 2, wherein the terminal body is configured such that a bus bar is welded thereon.

4. The energy storage element according to claim 2, wherein the terminal body is configured such that a terminal of an external load is welded thereon.

5. The energy storage element according to claim 2, wherein the terminal body includes a plate-shaped terminal body.

6. The energy storage element according to claim 1, further comprising an external insulation sealing member which insulates the electrode terminal from the cap part.

* * * * *